United States Patent
Tarr

(10) Patent No.: US 6,595,243 B2
(45) Date of Patent: Jul. 22, 2003

(54) SWIMMING POOL PLUMBING WATER/ DEBRIS BARRIER DEVICE AND METHOD

(75) Inventor: William C. Tarr, Waddell, AZ (US)

(73) Assignee: Shasta Industries, Inc., Phoenix, AZ (US)

( * ) Notice: Subject to any disclaimer, the term of this patent is extended or adjusted under 35 U.S.C. 154(b) by 0 days.

(21) Appl. No.: 10/201,126

(22) Filed: Jul. 22, 2002

(65) Prior Publication Data

US 2003/0098081 A1 May 29, 2003

Related U.S. Application Data

(60) Provisional application No. 60/334,049, filed on Nov. 28, 2001.

(51) Int. Cl.$^7$ .............................. F16L 55/00; F16J 15/10
(52) U.S. Cl. ................... 138/96 R; 138/96 T; 285/4; 4/501
(58) Field of Search ............................. 138/96 R, 96 T; 285/4, 3; 4/501, 504

(56) References Cited

U.S. PATENT DOCUMENTS

| | | | |
|---|---|---|---|
| 1,933,117 A | * 10/1933 | Markle | 285/3 |
| 3,523,552 A | 8/1970 | Ogden | 137/592 |
| 4,063,759 A | 12/1977 | Steimle | 285/189 |
| 4,212,486 A | 7/1980 | Logsdon | 285/4 |
| 4,261,598 A | 4/1981 | Cornwall | 285/56 |
| 4,623,170 A | 11/1986 | Cornwall | 285/4 |
| 4,732,397 A | 3/1988 | Gavin | 277/207 |
| 4,746,023 A | * 5/1988 | Belter | 277/637 |
| 4,951,326 A | 8/1990 | Barnes et al. | 4/494 |
| 5,040,250 A | 8/1991 | Barnes et al. | 4/494 |
| 5,286,040 A | 2/1994 | Gavin | 277/207 |
| 5,624,123 A | 4/1997 | Meyers | 277/9 |
| 5,711,536 A | 1/1998 | Meyers | 277/207 |
| 6,029,981 A | 2/2000 | Hawley et al. | 277/607 |

* cited by examiner

Primary Examiner—Patrick Brinson
(74) Attorney, Agent, or Firm—Cahill, von Hellens & Glazer P.L.C.

(57) ABSTRACT

A barrier device (1) and technique for use in the plumbing during construction of a swimming pool includes a tubular cylindrical section (2) having an open first end. A pop-out barrier (12) is integral with the cylindrical section, and is disposed to cover a second end of the cylindrical section. In one embodiment, an annular water barrier flange (3) is integral with the cylindrical section, and is disposed about a mid portion of the cylindrical section to prevent water leakage around an outer surface of the cylindrical section (2) when the barrier device is installed on the end of a water return pipe or drain pipe extending through the a wall surface of a swimming pool.

8 Claims, 4 Drawing Sheets

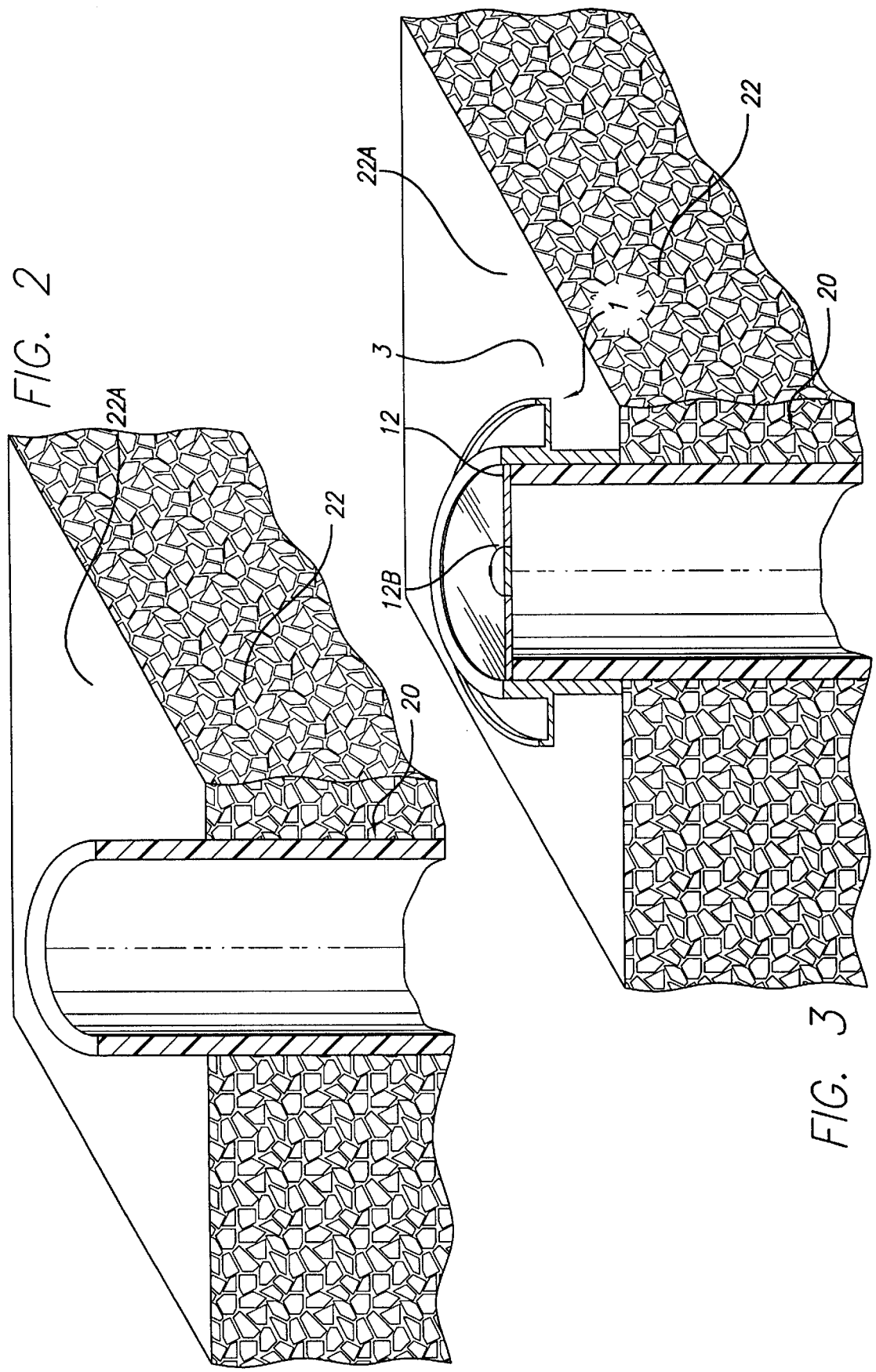

SWIMMING POOL PLUMBING WATER/DEBRIS BARRIER DEVICE AND METHOD

This application claims the benefit of prior filed U.S. provisional application Ser. No. 60/334,049 filed Nov. 28, 2001 entitled "SWIMMING POOL LEAK STOP PLUMBING ADAPTER AND METHOD" by William C. Tarr.

BACKGROUND OF THE INVENTION

The invention relates to improvements in the plumbing part of the construction of swimming pools. More particularly, the invention relates to a barrier device and method which (1) prevents leakage of pool water around plumbing, such as return pipes, extending through the gunite (i.e., shotcrete) layer of the wall of the partially constructed swimming pool or drain pipes extending through the gunite layer for connection to drain fixtures, and (2) also prevents leakage of plaster or other interior surface finishing material into open ends of any exposed plumbing extending through the gunite layer as the plaster or other finishing material is applied thereto.

A problem of the prior art is that the above described application of plaster or other interior surface finishing material results in leakage of some of the material into the open ends of the return water pipes or drain pipes as the material is being applied. The presence of plaster or the like in the open ends of the water return pipes or drain pipes may cause considerable difficulty, especially if slurry or plaster material hardens before being removed from the pipes.

In the past, pool construction workers have sometimes applied tape over, or inserted sponges into, the open ends of the return water pipes or drain pipes extending through and beyond the gunite layer of which the swimming pool wall and floor are constructed. However, that approach has been inadequate, because some of the plaster or slurry inevitably passes through the tape or sponge into the open end of the water return pipes and/or drain pipes.

Another problem of the prior art is that after the swimming pool construction has been completed and the pool has been filled with water, leakage of pool water occurs around the outside surfaces of the return water pipes and drain pipes through defective seals between the water pipes and the pool wall, because of the failure of pool wall materials to provide a reliable seal with the outside surfaces of the pipes. When gunite is applied to the interior of the pool, the nozzle usually is positioned higher than plumbing pipes that pass through the pool "shell" or wall. This often leaves a void underneath a protruding pipe. Also, the gunite material being applied can slump and create voids around plumbing that passes through the pool wall. Such voids can cause leakage of pool water if a good seal is not provided around the pipe during application of the interior surface plaster or other finish. Also, during temperature changes from summer to winter in warmer climates, the gunite and interior finish expands and contracts. This causes leakage of pool water around plumbing pipes that pass through the gunite structure. Such leakage can cause soil expansion problems and cracking of the swimming pool wall. Repairing such a defective seal after the pool has been completed can be very expensive, especially if the surrounding portion of the pool bottom or pool wall needs to be removed by means of a jack-hammer and replaced by new wall material.

U.S. Pat. No. 4,951,326 (Barnes et al.) discloses several "eyeball" fittings which can be provided in the floor and wall of the swimming pool or spa during construction. The "eyeball" fittings are relatively high-precision, expensive fittings, and their pivoting operation would be impaired by plaster debris introduced into the fittings during plastering of the pool or spa. To avoid this difficulty, the "eyeball" fittings have caps which prevent plaster or other finish from entering the fittings as the finish is applied. In one embodiment, a breakaway cap 30 is integral with a threaded retaining ring that retains a spherical eyeball member in the fitting. After the finishing operation, the retaining ring is threaded further into the fitting, causing pressure of the fitting on the periphery of the cap to break it away from the retaining ring. In another embodiment disclosed in U.S. Pat. No. 4,951,326, a disk-shaped breakaway cap 50 is attached by a frangible web 54 and a pair of diametrically opposed tabs 61 to an open mouth of the fitting. The tabs 61 act as pivot points when a peripheral point of the breakaway cap is hit with a hammer, causing it to tilt so it can be grasped and removed by breaking the tabs. The device is costly because it requires several separate molded parts. In a third embodiment, a breakaway cap 70 includes hook-like projections that hold the breakaway cap 70 in place during plastering or other finishing by extending into and engaging the socket within which the "eyeball" element is retained. After plastering, a screwdriver is forced through a weak spot 74 in the breakaway cap 70 and tilted so as to disengage the book-like projections and remove the breakaway cap. The devices disclosed in U.S. Pat. No. 4,951,326 are intended to be used as restricted wall return fittings for the purpose of controlling the direction of pool water being returned into the pool.

U.S. Pat. No. 4,063,759 (Steimle) discloses a water barrier device including the tubular sleeve encircled by flanges having a fluid-tight seal with the exterior of the pipe extending through the wall of the swimming pool. The device must be slipped over the outside portion of pool plumbing in order to be embedded into the gunite or pool finish. Therefore, it is necessary to clean a relatively large surface area of the end of the pipe before the tubular sleeve can be slid over the end of pipe and cemented thereto. However, pool finish contractors usually will not use this type of fitting because the cleaning of the pipes required before installing this type of water barrier is far too time consuming.

It would be desirable to provide a practical device and technique to prevent leakage of water in a swimming pool around return water pipes and drain pipes extending through the walls of swimming pools and simultaneously provide a convenient, inexpensive way of preventing plaster or other interior surface finishing material from leaking into the open ends of return water pipes and drain pipes while plaster or other interior surface material is being applied onto the gunite layers of partially constructed swimming pools.

SUMMARY OF THE INVENTION

It is an object of the invention to provide a barrier device and technique for making improved plumbing connections along the interior surface of a swimming pool to avoid leakage of pool water around plumbing connections through the pool wall.

It is another object of the invention to provide a barrier device and technique to prevent plaster or other interior pool finishing material from entering open ends of plumbing connections such as water return pipes or drain pipes extending through the gunite wall layer of a partially constructed swimming pool during application of plaster or other interior pool surface material to the gunite layer.

It is another object of the invention to provide a single device that effectively functions as both a barrier device for making improved plumbing connections along the interior surface of a swimming pool to avoid leakage of pool water around plumbing connections through the pool wall and as a barrier device to prevent plaster or other interior pool finishing material from entering open ends of plumbing connections such as water return pipes or drain pipes extending through the gunite wall layer of a partially constructed swimming pool during application of plaster or other interior pool surface material to the gunite layer.

Briefly described, and in accordance with one embodiment thereof, the invention provides a barrier device and technique for use in the plumbing during construction of a swimming pool. The barrier device (1) includes a tubular cylindrical section (2) having an open first end. A pop-out barrier (12) is integral with the cylindrical section, at a second end portion of the cylindrical section, and is disposed to cover the second end portion of the cylindrical section. In the described embodiment, an annular water barrier flange (3) is integral with the cylindrical section, and is disposed about a mid portion of the cylindrical section to prevent water leakage around the outer surface of the cylindrical section (2) when the barrier device is installed on the end of a water return pipe or a drain pipe extending through the wall surface of a swimming pool. The pop-out barrier includes a thin annular section (12A) peripherally connected by a thinned or scored first web (15) and a thickened hinge portion (15A) of the first web to an edge portion of the second end. The pop-out barrier also includes an inner section (12B) peripherally connected by a end second web (17) and a thickened hinge portion (17A) of the second web to an inner edge portion of the annular section (12A). In the described embodiment, a barrier device is a debris/water barrier device, wherein an integral annular water barrier flange (3) is disposed about a mid portion of the cylindrical section to prevent water leakage around an outer surface of the cylindrical section (2) when the device is installed on an open end of the water return pipe or drain pipe. The annular water barrier flange includes an outer surface (3B) and a peripheral lip (3A) extending outward from the outer surface.

Construction of the swimming pool includes applying gunite material to form a wall and a floor of the swimming pool so that open end portions of a plurality of water return pipes extend beyond a surface of the gunite material. A debris/water barrier device or the like is attached to each extending open end portion, respectively. A layer of interior finish material is applied to the gunite so that the interior finish material is flush or nearly flush with the pop-out barrier (12).

The inner section (12B) is struck so as to break part of the second web (17) so that the inner section (12B) hangs inside a volume bounded by the pop-out barrier (12). A retracting element is inserted into a resulting hole in the annular section, and the annular section (12A) is pulled outward so as to break the first web (15) in removing the pop-out barrier (12).

BRIEF DESCRIPTION OF THE DRAWINGS

FIG. 2 is a partial perspective view illustrating a water return pipe or drain pipe extending through the gunite wall of a partially constructed swimming pool.

FIG. 3 is a partial perspective cutaway section view illustrating installation of the debris/water barrier device of FIGS. 1A and 1B on an open end of the pipe in FIG. 2 extending through the inner surface of a gunite layer of a partially constructed swimming pool.

DETAILED DESCRIPTION OF THE PREFERRED EMBODIMENTS

Figure 1A:
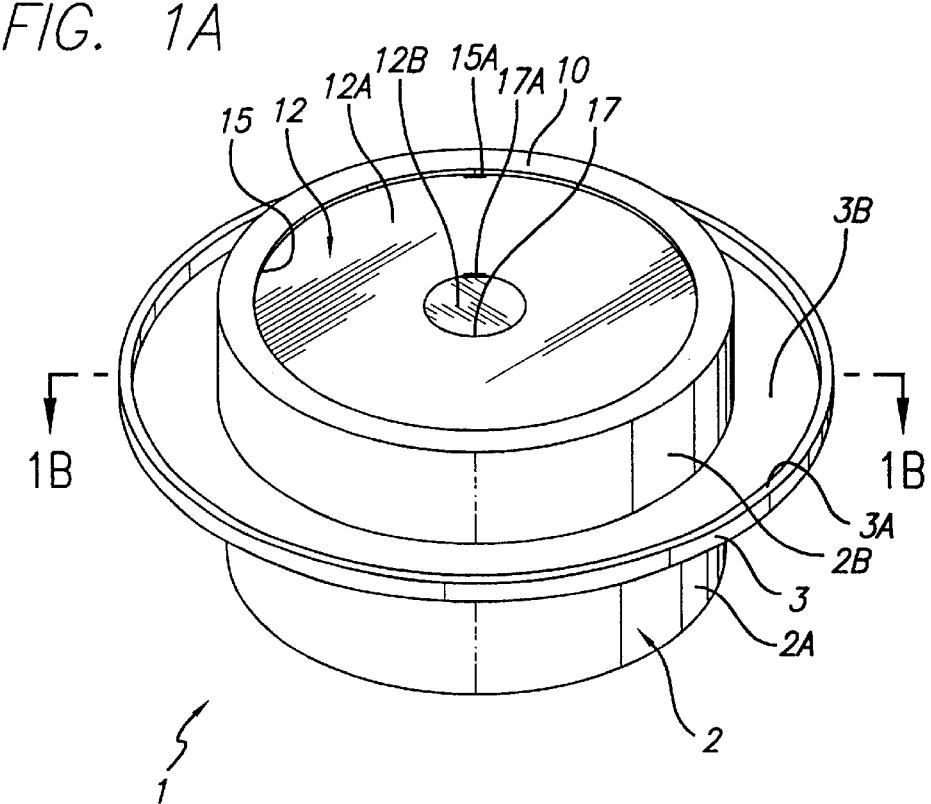
FIG. 1A is a perspective view of a debris/water barrier device for plumbing swimming pools.
Figure 1B:
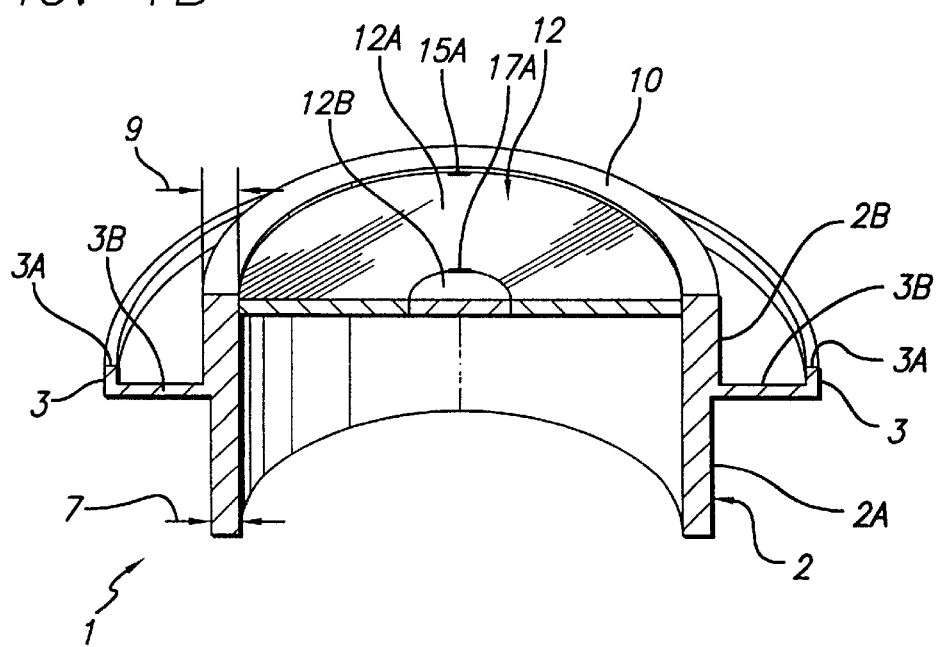
FIG. 1B is a partial perspective cutaway view of the debris/water barrier device of FIG. 1A.

Referring to FIGS. 1A and 1B, debris/water barrier device 1 of the present invention includes a hollow, open-bottom cylindrical section 2 having a 1.5 inch inside diameter into which a standard 1.5 inch PVC schedule 40 pipe can be inserted. Cylindrical section 2 includes a lower section 2A and an upper section 2B having the same inside diameter as lower section 2 and a larger outside diameter than lower section 2A. The lower section 2A has an outside diameter which is tapered from 2.015 inches at its bottom edge to 2.050 inches at its upper portion. This allows lower section 2A to be snugly inserted into and cemented within an open end of a standard 2 inch schedule 40 PVC pipe 20 despite variations in the inside diameter thereof, if 2 inch PVC pipe rather than 1.5 inch PVC pipe is used. In a prototype device, the length of cylindrical section 2 (including both sections 2A and 2B) is ⅜ inches. This also allows the fitting to be installed precisely perpendicular to the finished interior pool surface.

The top end 10 of cylindrical section 2 is covered by an integral thin, disk-shaped pop-out barrier 12 which preferably is integral with cylindrical section 2. Reference numeral 15 indicates a thin cut or thin web around the periphery of pop-out barrier 12 which allows it to be easily popped out from cylindrical section 2, and reference numeral 15A designates a thickened "hinge" portion of web 2 to more firmly connect pop-out barrier 12 to the inside of upper section 2B of cylindrical section 2 when the rest of barrier 12 is popped out. Pop-out barrier 12 includes an annular pop-out section 12A the periphery of which is connected by thin web 15 directly to upper section 2B of cylindrical section 2, and also includes a central circular (or other shape) pop-in barrier 12B which can be popped inward relative to annular pop-out section 12A, to allow a hook, finger or the like to be inserted through the resulting hole in order to pull out annular pop-out section 12A. Reference numeral 17 indicates a thin cut or thin web around the periphery of central pop-in barrier 12B which allows pop-in barrier 12B to be easily popped inward, and reference numeral 17A designates a thickened "hinge" portion of web 17 to more firmly connect central pop-in barrier 12B to the inside of upper section 2B of cylindrical section 2 when the rest of barrier numeral 12B is popped in. This prevents pop-out section 12 from falling downward into the pipe 20 (FIG. 3) on which debris/water barrier device 1 is installed and therefore avoids the difficulty of retrieving a pop-in barrier 12B that has fallen into the pipe.

An annular water barrier flange 3 is attached to and surrounds the mid section of cylindrical section 2. The diameter of water barrier flange 3 can be 3 inches. Water barrier flange 3 has a raised peripheral lip 3A which rises ⅛ of an inch above a flat annular upper surface 3B of water barrier flange 3 as shown in FIG. 1A. The purpose of water barrier flange 3 is to provide a high-integrity seal with the plaster or other interior surface material which is applied to the gunite layer.

Preferably, debris/water barrier device 2 is a completely integral unit formed of ABS plastic, although other suitable plastic material such as PVC (polyvinyl chloride) or CPVC can be used.

Referring to FIG. 2, reference numeral 20 designates either the open end section of a drain pipe or the open end of a swimming pool water return pipe coupled to the low pressure side of a pool pump (or the open end of a return pipe extending through the pool wall and coupled to the high pressure side of the pool pump). The open end of pipe 20 extends above or beyond a gunite layer 22 lining the walls and bottom of a hole that has been excavated for construction of the swimming pool. Typically, if pipe section 20 is 1.5 inch PVC pipe, its outer end extends so that it will be flush with the layer of plaster or other finish subsequently applied to gunite layer 22, and if the pipe section 20 is 2 inch PVC pipe, its outer end extends so that it is approximately ⅝ inches behind the layer of plaster or other finish subsequently applied to the inner surface of gunite layer 22.

Normally, the next stage in construction of the pool is to apply a layer of plaster or other pool interior surface material onto the gunite layer surface 22A. (As previously mentioned, in the past workers sometimes have placed duct tape or sponge over or into the open end of pipe 20 to prevent the plaster or other pool interior surface material from leaking into the pipe 20.)

Figure 7:
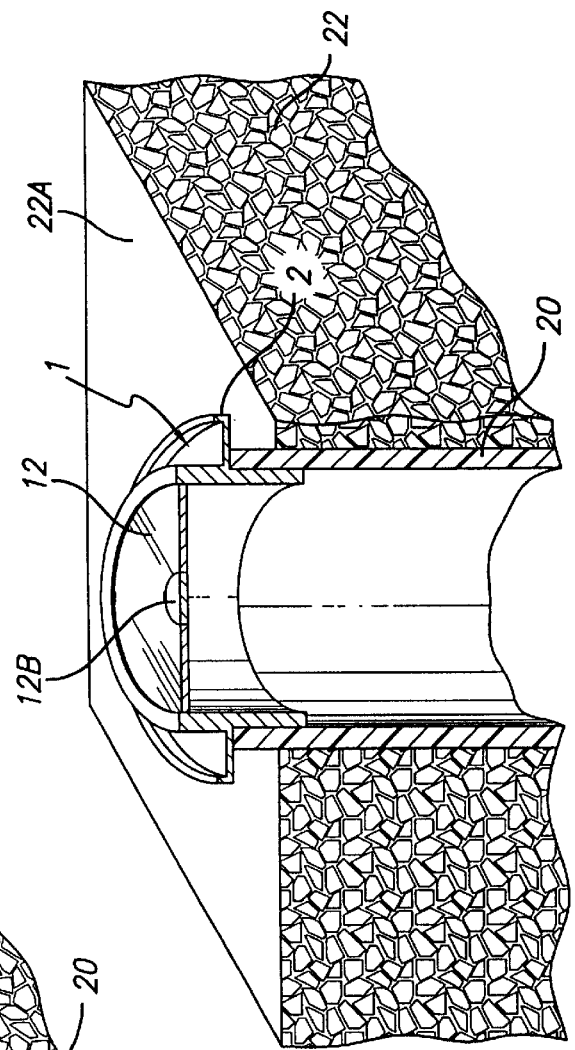
FIG. 7 is a partial perspective cutaway section view illustrating an alternative installation of the debris/water barrier device of FIGS. 1A and 1B on an open end of the pipe in FIG. 2 extending through the inner surface of a gunite layer of a partially constructed swimming pool.

However, in accordance with the present invention, an end portion of pipe 20 is cleaned to remove gunite debris or other debris there from. For 1.5 inch PVC pipe, the end portion to be cleaned typically is 1 to 3 inches long. Then debris/water barrier device 1 is installed on the open end of pipe 20, above the gunite surface 22A as shown in FIG. 3. (If pipe 20 is a water return pipe, then it may extend horizontally beyond, rather than vertically above, the gunite surface.) Depending on whether pipe 20 is 1.5 inch or 2 inch schedule 40 PVC pipe, it can either be slid into the inside passage extending through debris/water barrier device 1 or it can be slid over the slightly tapered outer surface of lower section 2A as shown in FIG. 7. In either case the joint can be cemented by means of ordinary PVC cement. If pipe 20 is 1.5 inch Schedule 40 PVC pipe, it can be slid entirely through debris/water barrier device 1 if barrier 12 is popped out, so that the outer end of pipe 20 extends beyond the edge 10. Then a threaded PVC adapter can be cemented to the protruding outer end portion of pipe 20 to facilitate mounting a fixture thereon.

Figure 4:
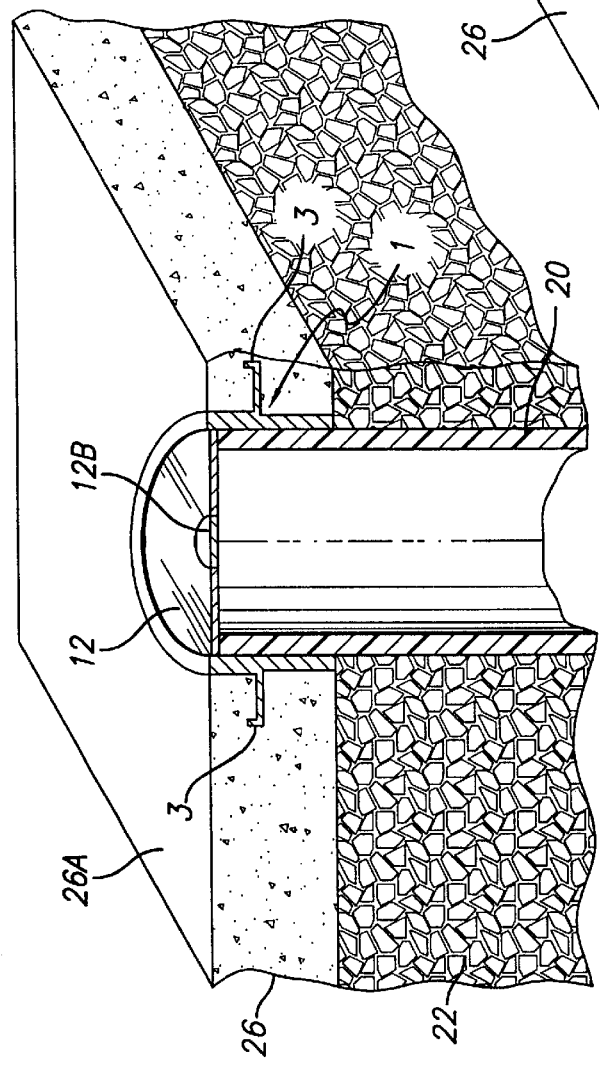
FIG. 4 is a partial perspective cutaway section view illustrating the structure of FIG. 2 after application of a layer of plaster surfacing on the gunite layer.

Referring to FIG. 4, the next step in the pool construction process is to apply a layer 26 of plaster (or other interior pool surface material) on the gunite surface 22A, so that the outer surface 26A of the plaster layer is flush with the top of debris/water barrier device 1. During this process, pop-out barrier 12 prevents any of the plaster (or other interior pool surface material) from entering the open end of pipe 20. During application of the plaster 26, the pop-out barrier 12 prevents any plaster (or other interior pool surface material) from entering the open end of pipe 20, and the annular water barrier flange 3 provides a high-integrity seal with the plaster or other pool interior surface material.

Removal of pop-out barrier 12 needs to be done in such a manner that it does not fall into pipe 20. This will not happen if pipe 20 is 1.5 inch schedule 40 PVC pipe as illustrated in FIGS. 2–6, because the diameter of pop-out barrier 12 is greater than the inside diameter of 1.5 inch schedule 40 PVC pipe. However, if pipe 20 is 2 inch schedule 40 PVC pipe and therefore is fit over the outer surface of lower section 2A of debris/water barrier device 1, then pop-out barrier 12 may fall into pipe 20 and cause the above mentioned retrieval problem.

Figure 5:
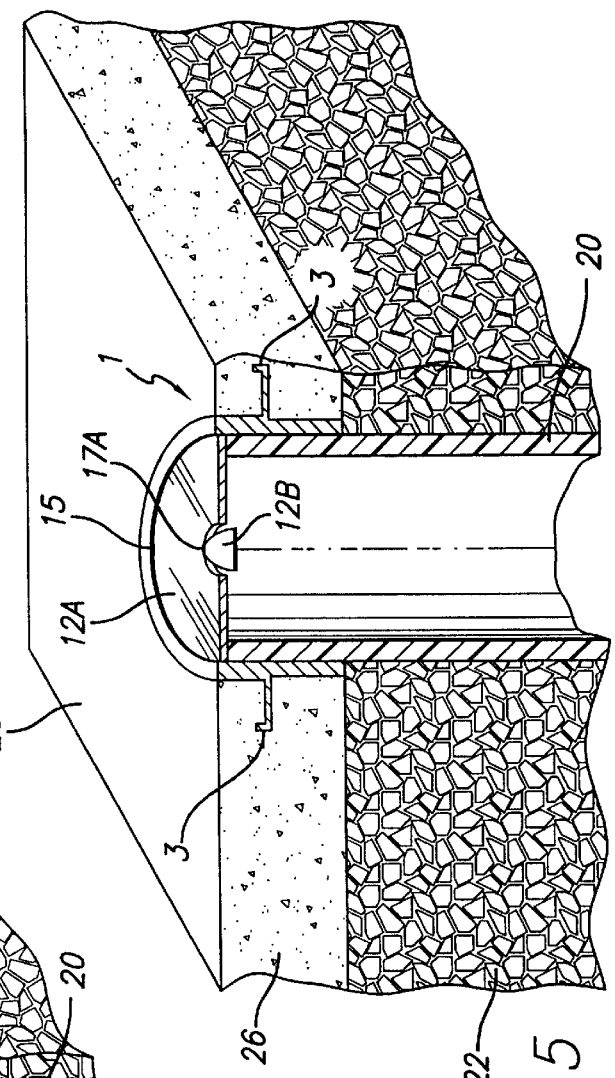
FIG. 5 is a partial perspective cutaway section view illustrating removal of the center pop-out barrier of the debris/water barrier device of FIGS. 1A and 1B.
Figure 6:
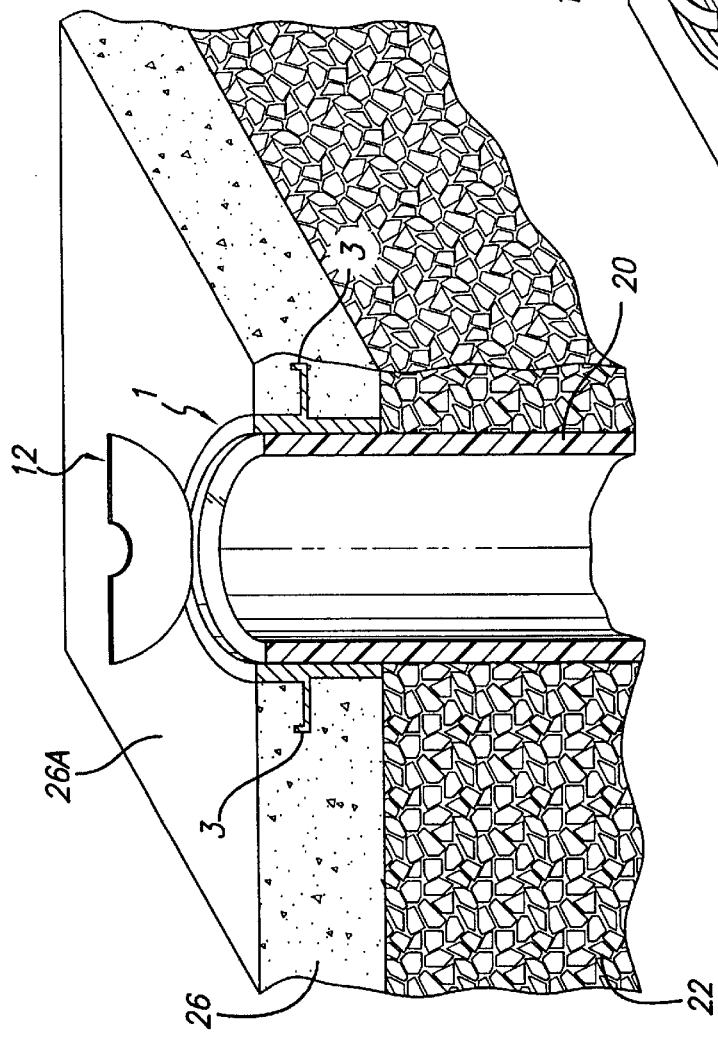
FIG. 6 is a partial perspective cutaway section view illustrating removal of the outer pop-out barrier from the debris/water barrier device.

To avoid this problem, pop-out barrier 12 can be removed by a two-step process as shown in FIGS. 5 and 6. First, the small, center pop-in barrier 12B can be popped inward or downward as shown in FIG. 5. The thickened hinge portion 17A shown in FIGS. 1A and 1B will cause center pop-in barrier 12B to hang downward as illustrated.

Then, as shown in FIG. 6, a screwdriver or the like can be inserted through the center opening left by the removal of center pop-in barrier 12B and wielded to pop barrier 12A outward. The thickened hinge portion 15 (FIG. 1A) retains pop-out barrier 12 in the configuration shown in FIG. 6. Pop-out barrier 12 then can be easily pulled loose and discarded. Then, if desired, a conventional fitting can be installed on or in the open end of debris/water barrier device 1.

The above described debris/water barrier device and method of installation avoids the need to use the above mentioned ineffective duct tape to prevent the leakage of plaster or the like into the open end of return water pipes or drain pipes during the interior pool surface application process. The above described debris/water barrier device and method also prevent undesired leakage of pool water along the outer surfaces of water return pipes and drain pipes, because the annular water barrier flange 3 provides more surface area for the plaster (or other interior pool surface material) to seal with. The provision of the raised lip 3A allows the plaster 26 to readily fill the recess defined by raised lip 3A, bottom surface 3B and the wall of upper section 2B, and thereby provides increased structural rigidity of the interface between the plaster 26 and the annular flange 3, which ensures a good seal despite the presence of voids and/or slight distortions of the gunite wall or pipe 20 which weaken the seal, for example, due to thermal gradients and differences in the thermal coefficients, stresses due to the shifting of the earth, etc. The bottom surface of annular flange 3 is flat in order to avoid formation of any void spaces underneath the flange 3 as the plaster 26 flows underneath flange 3. (Any such voids would reduce the structural integrity of the interface between water barrier flange 3 and the gunite and therefore would reduce the long-term reliability of the seal between them.) The increased structural rigidity is desirable to prevent the seal between the plaster and stop leak device 1 from being weakened or disrupted by stress at the interface between plaster layer 26 and gunite layer 22 caused by the different coefficients of expansion of plaster layer 26 and gunite layer 22. The need to clean a 2 to 3 inch section of pipe 20 as would be necessary for use of the barrier device disclosed in above mentioned U.S. Pat. No. 4,063,759 is avoided. The ability of the described debris/water barrier device 1 to be mounted in either 1.5 inch or 2 inch Schedule 40 PVC pipe avoids the cost of manufacturing and stocking two different sizes thereof.

While the invention has been described with reference to several particular embodiments thereof, those skilled in the art will be able to make the various modifications to the described embodiments of the invention without departing from the true spirit and scope of the invention. It is intended that all elements or steps which are in substantially different or perform substantially the same function in substantially the same way to achieve the same result as what is claimed are within the scope of the invention. For example, pop-out barrier 12 could be slightly recessed into the top end 10 of debris/barrier device 1.

What is claimed is:

1. A device for both preventing debris from entering a drain pipe or water return pipe during interior surface finishing of a swimming pool and preventing leakage of pool water through the wall of the swimming pool along a drain pipe or a return pipe of the swimming pool, comprising:

(a) a tubular cylindrical section having an open first end;

(b) a pop-out barrier integral with the cylindrical section, flush with a second end of the cylindrical section, and disposed to cover the second end of the cylindrical section; and (c) an annular water barrier flange integral with the cylindrical section and disposed about a mid portion of the cylindrical section to prevent water leakage around an outer surface of the cylindrical section when the device is installed on an open end of the water return pipe or drain pipe, wherein the annular water barrier flange includes an outer surface and a ridge extending outward from the outer surface.

2. The device of claim 1 wherein the pop-out barrier includes an annular section peripherally connected by a thin first web and a thick hinge portion of the first web to an edge portion of the second end, the pop-out barrier also including an inner section peripherally connected by a thin second web and a thick hinge portion of the second web to an inner edge portion of the annular section.

3. The device of claim 2 wherein an outside diameter of the cylindrical section at the open first end tapers from a first value to a larger second value at the annular water barrier flange to accommodate a range of inside diameter of 2 inch schedule 40 PVC pipe.

4. The device of claim 2 wherein the length of cylindrical section is approximately ⅜ inches.

5. The device of claim 4 composed entirely of plastic material.

6. The device of claim 4 wherein the plastic material is selected from the group consisting of ABS plastic and PVC plastic.

7. A device for both preventing debris from entering a drain pipe or water return pipe during interior surface finishing of a swimming pool and preventing leakage of pool water through a wall of the swimming pool along a drain pipe or a return pipe of the swimming pool, comprising:

(a) a tubular cylindrical section having an open first end;

(b) pop-out barrier means integral with the cylindrical section and disposed to cover a second end of the cylindrical section; and (c) annular leakage barrier flange means integral with the cylindrical section and disposed about a mid portion of the cylindrical section to prevent water leakage around an outer surface of the cylindrical section when the device is installed on an open end of the water return pipe or drain pipe.

8. A method of constructing a swimming pool including the steps of:

(a) applying gunite material to form a wall and floor of the swimming pool so that open end portions of a plurality of water return pipes extend beyond a surface of the gunite material;

(b) cleaning debris from the extending open end portions of the water return pipes;

(c) attaching a debris/water barrier device to each extending open end portion, respectively, each debris/water barrier device including i. a tubular cylindrical section having an open first end, ii. a pop-out barrier integral with the cylindrical section, flush with a second end of the cylindrical section, and disposed to cover the second end of the cylindrical section, and iii. an annular water barrier flange integral with the cylindrical section and disposed about a mid portion of the cylindrical section to prevent water leakage around an outer surface of the cylindrical section when the debris/water barrier device is installed on an open end of the water return pipe or drain pipe, wherein the pop-out barrier includes an annular section peripherally connected by a thin first web and a thick hinge portion of the first web to an edge portion of the second end, the pop-out barrier also including an inner section peripherally connected by a thin second web and a thick hinge portion of the second web to an inner edge portion of the annular section;

(d) applying a layer of interior finish material on the gunite material so that the interior finish material is flush with the pop-out barrier;

(e) striking the inner section to break the second web so that the inner section hangs inside a volume bounded by the pop-out barrier; and (f) inserting a retracting element into a hole left in the annular section by step (e) and pulling the annular section outward so as to break the first web and removing the pop-out barrier from the cylindrical section.

* * * * *